(12) United States Patent
Tsai

(10) Patent No.: US 12,360,345 B2
(45) Date of Patent: Jul. 15, 2025

(54) OPTICAL IMAGING LENS INCLUDING SEVEN LENSES OF—++-++ REFRACTIVE POWERS

(71) Applicant: Calin Technology Co., Ltd., Taichung (TW)

(72) Inventor: Po-Nien Tsai, Pingtung County (TW)

(73) Assignee: CALIN TECHNOLOGY CO., LTD., Taichung (TW)

( * ) Notice: Subject to any disclaimer, the term of this patent is extended or adjusted under 35 U.S.C. 154(b) by 688 days.

(21) Appl. No.: 17/708,954

(22) Filed: Mar. 30, 2022

(65) Prior Publication Data

US 2023/0161137 A1 May 25, 2023

(30) Foreign Application Priority Data

Oct. 25, 2021 (TW) .................................. 110139514

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC .............................. G02B 9/64; G02B 13/0045
See application file for complete search history.

(56) References Cited

U.S. PATENT DOCUMENTS

| 2018/0120544 A1 | 5/2018 | Chiang et al. |
| 2020/0301105 A1 | 9/2020 | Jung et al. |

FOREIGN PATENT DOCUMENTS

| CN | 110737073 A | 1/2020 |
| TW | I651656 B | 2/2019 |
| TW | 202028800 A | 8/2020 |

OTHER PUBLICATIONS

TW-I651564-B, translation (Year: 2019).*
Taiwanese Search Report dated Mar. 8, 2022 for Application No. 110139514 with an English translation.

* cited by examiner

*Primary Examiner* — Wen Huang
(74) *Attorney, Agent, or Firm* — Birch, Stewart, Kolasch & Birch, LLP

(57) ABSTRACT

An optical imaging lens, in order from an object side to an image side along an optical axis, includes a first optical assembly, a second optical assembly, a third optical assembly, an aperture, a fourth optical assembly, and a fifth optical assembly, wherein two of the first optical assembly, the second optical assembly, the third optical assembly, the fourth optical assembly, and the fifth optical assembly are a compound lens formed by adhering at least two lenses, while the others are single lens, thereby achieving the effect of high image quality and low distortion.

11 Claims, 12 Drawing Sheets

OPTICAL IMAGING LENS INCLUDING SEVEN LENSES OF—++-++ REFRACTIVE POWERS

BACKGROUND OF THE INVENTION

Technical Field

The present invention generally relates to an optical image capturing system, and more particularly to an optical imaging lens, which provides a better optical performance of high image quality and low distortion.

Description of Related Art

In recent years, with advancements in portable electronic devices having camera functionalities, the demand for an optical image capturing system is raised gradually. The image sensing device of the ordinary photographing camera is commonly selected from a charge-coupled device (CCD) or a complementary metal-oxide-semiconductor sensor (CMOS Sensor). Besides, as advanced semiconductor manufacturing technology enables the minimization of the pixel size of the image sensing device, the development of the optical image capturing system towards the field of high pixels. Moreover, with the advancement in drones and driverless autonomous vehicles, Advanced Driver Assistance System (ADAS) plays an important role, collecting environmental information through various lenses and sensors to ensure the driving safety of the driver. Furthermore, as the image quality of the automotive lens changes with the temperature of an external application environment, the temperature requirements of the automotive lens also increase. Therefore, the requirement for high imaging quality is rapidly raised.

Good imaging lenses generally have the advantages of low distortion, high resolution, etc. In practice, small size and cost must be considered. Therefore, it is a big problem for designers to design a lens with good imaging quality under various constraints.

BRIEF SUMMARY OF THE INVENTION

In view of the reasons mentioned above, the primary objective of the present invention is to provide an optical imaging lens that provides a better optical performance of high image quality and low distortion.

The present invention provides an optical imaging lens, in order from an object side to an image side along an optical axis, including a first optical assembly having negative refractive power, a second optical assembly having positive refractive power, a third optical assembly having positive refractive power, an aperture, a fourth optical assembly having positive refractive power, and a fifth optical assembly having positive refractive power, wherein two of the first optical assembly, the second optical assembly, the third optical assembly, the fourth optical assembly, and the fifth optical assembly include a compound lens formed by adhering at least two lenses, while the others are single lens.

The present invention further provides an optical imaging lens, in order from an object side to an image side along an optical axis, includes a first lens having negative refractive power, a second lens having negative refractive power, a third lens having positive refractive power, a fourth lens having positive refractive power, an aperture, a fifth lens having negative refractive power, a sixth lens having positive refractive power, and a seventh lens having positive refractive power. An object-side surface of the first lens is a convex surface, and an image-side surface of the first lens is a concave surface. The object-side surface of the first lens and/or the image-side surface of the first lens are/is an aspheric surface. The second lens is a biconcave lens. The third lens is a biconvex lens. An object-side surface of the third lens and an image-side surface of the second lens are adhered to form a compound lens with positive refractive power. An object-side surface of the fourth lens is a convex surface. An object-side surface of the fifth lens is a convex surface. The seventh lens is a biconvex lens. An object-side surface of the seventh lens and/or an image-side surface of the seventh lens are/is an aspheric surface.

With the aforementioned design, the optical imaging lens has a total of seventh lenses with refractive power and includes two compound lenses formed by adhering at least two of the lenses, thereby achieving the effect of high image quality and low distortion. In addition, the arrangement of the refractive powers and the conditions of the optical imaging lens of the present invention could achieve the effect of high image quality.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1A:
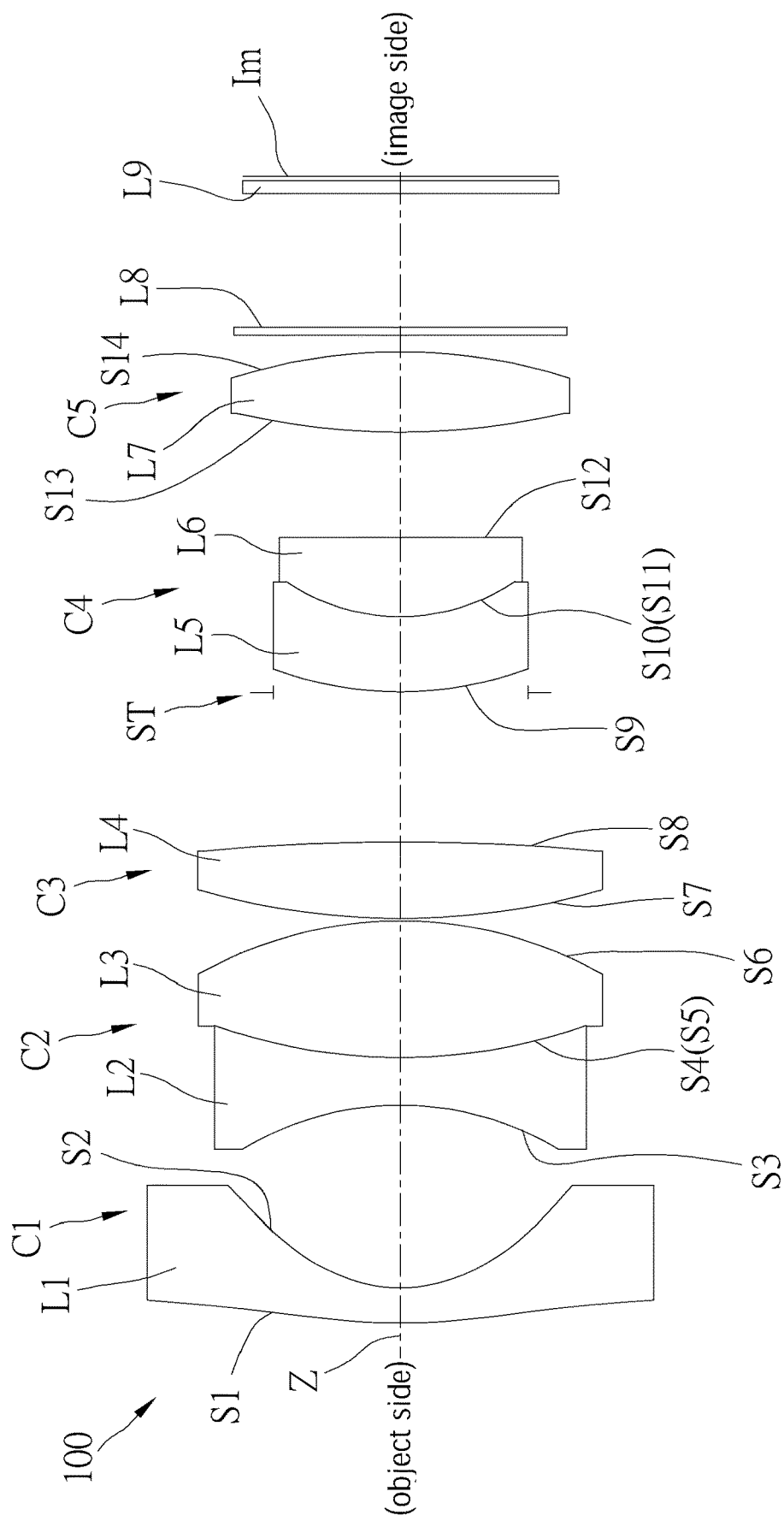
FIG. 1A is a schematic view of the optical imaging lens according to a first embodiment of the present invention.

An optical imaging lens 100 according to a first embodiment of the present invention is illustrated in FIG. 1A, which includes, in order along an optical axis Z from an object side to an image side, a first optical assembly C1, a second optical assembly C2, a third optical assembly C3, an aperture ST, a fourth optical assembly C4, and a fifth optical assembly C5, wherein two of the first optical assembly, the second optical assembly, the third optical assembly, the fourth optical assembly, and the fifth optical assembly include a compound lens with at least two lenses that are adhered, while the others are single lens. In the current embodiment, the second optical assembly C2 and the fourth optical assembly C4 are respectively a compound lens, while the first optical assembly C1, the third optical assembly C3, and the fifth optical assembly C5 are respectively a single lens.

The first optical assembly C1 has negative refractive power. In the current embodiment, the first optical assembly C1 is a single lens that includes a first lens L1, wherein the first lens L1 is a negative meniscus; an object-side surface S1 of the first lens L1 is a convex surface toward the object side, and an image-side surface S2 of the first lens L1 is a concave surface toward the image side; the object-side surface S1, the image-side surface S2, or both of the object-side surface S1 and the image-side surface S2 of the first lens L1 are aspheric surfaces. As shown in FIG. 1A, both of the object-side surface S1 and the image-side surface S2 of the first lens L1 are aspheric surfaces, and a part of a surface of the first lens L1 toward the image side is recessed to form the image-side surface S2, and the optical axis Z passes through the object-side surface S1 and the image-side surface S2 of the first lens L1.

The second optical assembly C2 has positive refractive power. In the current embodiment, the second optical assembly C2 is a compound lens formed by adhering a second lens L2 and a third lens L3, wherein the second lens L2 is a biconcave lens with negative refractive power (i.e., both of an object-side surface S3 of the second lens L2 and an image-side surface S4 of the second lens L2 are concave surfaces). As shown in FIG. 1A, a part of a surface of the second lens L2 toward the object side is recessed to form the object-side surface S3, and the optical axis Z passes through the object-side surface S3 and the image-side surface S4 of the second lens L2.

The third lens L3 is a biconvex lens (i.e., both of an object-side surface S5 of the third lens L3 and an image-side surface S6 of the third lens L3 are convex surfaces) with positive refractive power. In the current embodiment, a part of a surface of the third lens L3 toward the object side is convex to form the object-side surface S5, and a surface of the third lens L3 toward the image side is convex to form the image-side surface S6, and the optical axis Z passes through the object-side surface S5 and the image-side surface S6 of the third lens L3, wherein the object-side surface S5 of the third lens L3 and the image-side surface S4 of the second lens L2 are adhered to form a same surface.

The third optical assembly C3 has positive refractive power. In the current embodiment, the third optical assembly C3 is a single lens that includes a fourth lens L4, wherein the fourth lens L4 is a biconvex lens (i.e., both of an object-side surface S7 of the fourth lens L4 and an image-side surface S8 of the fourth lens L4 are convex surfaces). As shown in FIG. 1A, the object-side surface S7 of the fourth lens L4 is convex toward the object side in an arc shape, and the image-side surface S8 of the fourth lens L4 is slightly convex toward the image side.

The fourth optical assembly C4 has positive refractive power. In the current embodiment, the fourth optical assembly C4 is a compound lens formed by adhering a fifth lens L5 and a sixth lens L6, wherein the fifth lens L5 is a negative meniscus; an object-side surface S9 of the fifth lens L5 is a convex surface toward the object side, and an image-side surface S10 of the fifth lens L5 is a concave surface toward the image side. As shown in FIG. 1A, a part of a surface of the fifth lens L5 toward the image side is recessed to form the image-side surface S10, and the optical axis Z passes through the object-side surface S9 and the image-side surface S10 of the fifth lens L5.

The sixth lens L6 is a biconvex lens (i.e., both of an object-side surface S11 of the sixth lens L6 and an image-side surface S12 of the sixth lens L6 are convex surfaces) with positive refractive power. In the current embodiment, a surface of the sixth lens L6 toward the object side is convex to form the object-side surface S11, and a surface of the sixth lens L6 toward the image side is slightly convex to form the image-side surface S12, wherein the object-side surface S11 of the sixth lens L6 and the image-side surface S10 of the fifth lens L5 are adhered to form a same surface.

The fifth optical assembly C5 has positive refractive power. In the current embodiment, the fifth optical assembly C5 is a single lens that includes a seventh lens L7, wherein the seventh lens L7 is a biconvex lens (i.e., both of an object-side surface S13 of the seventh lens L7 and an image-side surface S14 of the seventh lens L7 are convex surfaces) with positive refractive power; the object-side surface S13, the image-side surface S14, or both of the object-side surface S13 and the image-side surface S14 of the seventh lens L7 are aspheric surfaces. As shown in FIG. 1A, both of the object-side surface S13 and the image-side surface S14 of the seventh lens L7 are aspheric surfaces, and a surface of the seventh lens L7 toward the object side is slightly convex to form the object-side surface S13, and a surface of the seventh lens L7 toward the image side is convex to form the image-side surface S14.

Additionally, the optical imaging lens 100 further includes an infrared filter L8 and a protective glass L9, wherein the infrared filter L8 is disposed between the seventh lens L7 and the protective glass L9 and is closer to the image-side surface S14 of the seventh lens L7 than the protective glass L9, thereby filtering out excess infrared rays in an image light passing through the optical imaging lens 100 to improve imaging quality. The protective glass L9 for protecting the infrared filter L8 is disposed between the infrared filter L8 and an image plane Im of the optical imaging lens 100 and is closer to the image plane Im than the infrared filter L8.

In order to keep the optical imaging lens 100 in good optical performance and high imaging quality, the optical imaging lens 100 further satisfies:

$$-0.48 > f1/F > -0.53; \tag{1}$$

$$0.18 > f23/F > 0.13; \; -0.35 > f2/F > -0.42; \; 0.35 > f3/F > 0.25; \tag{2}$$

$$0.35 > f4/F > 0.3; \tag{3}$$

$$0.15 > f56/F > 0.05; \; -0.05 > f5/F > -0.15; \; 0.3 > f6/F > 0.2; \tag{4}$$

$$0.37 > f7/F > 0.3; \tag{5}$$

wherein F is a focal length of the optical imaging lens 100; f1 is a focal length of the first lens L1 of the first optical assembly C1; f23 is a focal length of the second optical assembly C2; f2 is a focal length of the second lens L2 of the second optical assembly C2; f3 is a focal length of the third lens L3 of the second optical assembly C2; f4 is a focal length of the fourth lens L4 of the third optical assembly C3; f56 is a focal length of the fourth optical assembly C4; f5 is a focal length of the fifth lens L5 of the fourth optical assembly C4; f6 is a focal length of the sixth lens L6 of the fourth optical assembly C4; f7 is a focal length of the seventh lens L7 of the fifth optical assembly C5.

Parameters of the optical imaging lens 100 of the first embodiment of the present invention are listed in following Table 1, including the focal length F of the optical imaging lens 100 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens, the focal length (cemented focal length) of the second optical assembly C2, and the focal length (cemented focal length) of the fourth optical assembly C4, wherein a unit of the focal length, the radius of curvature, and the distance is millimeter (mm).

TABLE 1

F = 5.91 mm; Fno = 1.74; HFOV = 97 deg

| Surface | R(mm) | D(mm) | Nd | Focal length | Cemented focal length | Note |
|---|---|---|---|---|---|---|
| S1 | 17.43 | 1.4 | 1.52 | −11.48 | 0 | L1 |
| S2 | 3.39 | 7.04 | 1 | 0 | 0 | |
| S3 | −7.87 | 1.86 | 1.88 | −15.02 | 38.12 | L2 |
| S4, S5 | 15.73 | 5.3 | 1.7 | 19.83 | 0 | L3 |
| S6 | −10.72 | 0.1 | 1 | 0 | 0 | |
| S7 | 21.49 | 3 | 1.88 | 17.31 | 0 | L4 |
| S8 | −57.07 | 5.81 | 1 | 0 | 0 | |
| ST | Infinity | 0.01 | 1 | 0 | 0 | ST |
| S9 | 11.33 | 2.94 | 1.99 | −64.75 | 64.3 | L5 |
| S10, S11 | 4.92 | 3.11 | 1.44 | 21 | 0 | L6 |
| S12 | −3337.22 | 4.08 | 1 | 0 | 0 | |
| S13 | 15.64 | 3.15 | 1.5 | 16.8 | 0 | L7 |
| S14 | −14.85 | 0.64 | 1 | 0 | 0 | |
| S15 | Infinity | 0.3 | 1.52 | 0 | 0 | Infrared filter L8 |
| S16 | Infinity | 5.21 | 1 | 0 | 0 | |
| S17 | Infinity | 0.5 | 1.52 | 0 | 0 | Protective glass L9 |
| S18 | Infinity | 0.16 | 1 | 0 | 0 | |
| Im | Infinity | | | | | |

It can be seen from Table 1 that, in the current embodiment, the focal length F of the optical imaging lens 100 is 5.91 mm, and the Fno is 1.74, and the HFOV is 97 degrees, wherein f1=−11.48 mm; f2=−15.02 mm; f3=19.83 mm; f4=17.31 mm; f5=−64.75 mm; f6=21 mm; f7=16.8 mm; f23=38.12 mm; f56=64.3 mm.

Additionally, based on the above detailed parameters, detailed values of the aforementioned conditional formula in the first embodiment are as follows: f1/F=−0.51; f23/F=0.16; f2/F=−0.39; f3/F=0.3; f4/F=0.34; f56/F=0.09; f5/F=−0.09; f6/F=0.28; f7/F=0.35.

With the aforementioned design, the first optical assembly C1 to the fifth optical assembly C5 satisfy the aforementioned conditions (1) to (5) of the optical imaging lens 100.

Moreover, an aspheric surface contour shape Z of each of the object-side surface S1 of the first lens L1, and the image-side surface S2 of the first lens L1, and the object-side surface S13 of the seventh lens L7, and the image-side surface S14 of the seventh lens L7 of the optical imaging lens 100 according to the first embodiment could be obtained by following formula:

$$Z = \frac{ch^2}{1 + \sqrt{1 - (1+k)c^2 h^2}} + A_2 h^2 + A_4 h^4 + A_6 h^6 + A_8 h^8 + A_{10} h^{10} + A_{12} h^{12} + A_{14} h^{14} + A_{16} h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S1 of the first lens L1, and the image-side surface S2 of the first lens L1, and the object-side surface S13 of the seventh lens L7, and the image-side surface S14 of the seventh lens L7 of the optical imaging lens 100 according to the first embodiment and the different order coefficient of A2, A4, A6, A8, A10, A12, A14, and A16 are listed in following Table 2:

TABLE 2

| Surface | S1 | S2 | S13 | S14 |
|---|---|---|---|---|
| k | −7.84E−01 | −1.07E+00 | 4.45E+00 | −2.55E−01 |
| A2 | 0 | 0 | 0 | 0 |
| A4 | −3.34E−04 | 4.02E−04 | −2.97E−04 | 1.93E−04 |
| A6 | 2.26E−06 | 2.15E−06 | −4.96E−06 | −1.52E−05 |
| A8 | −8.44E−09 | −3.15E−07 | 3.52E−07 | 8.30E−07 |
| A10 | −3.61E−11 | 1.49E−08 | −2.55E−08 | −4.22E−08 |
| A12 | 4.72E−13 | −3.30E−10 | 7.86E−10 | 1.07E−09 |
| A14 | 0.00E+00 | 1.77E−12 | −8.53E−12 | −9.94E−12 |
| A16 | 0 | 0 | 0 | 0 |

Figure 1B:
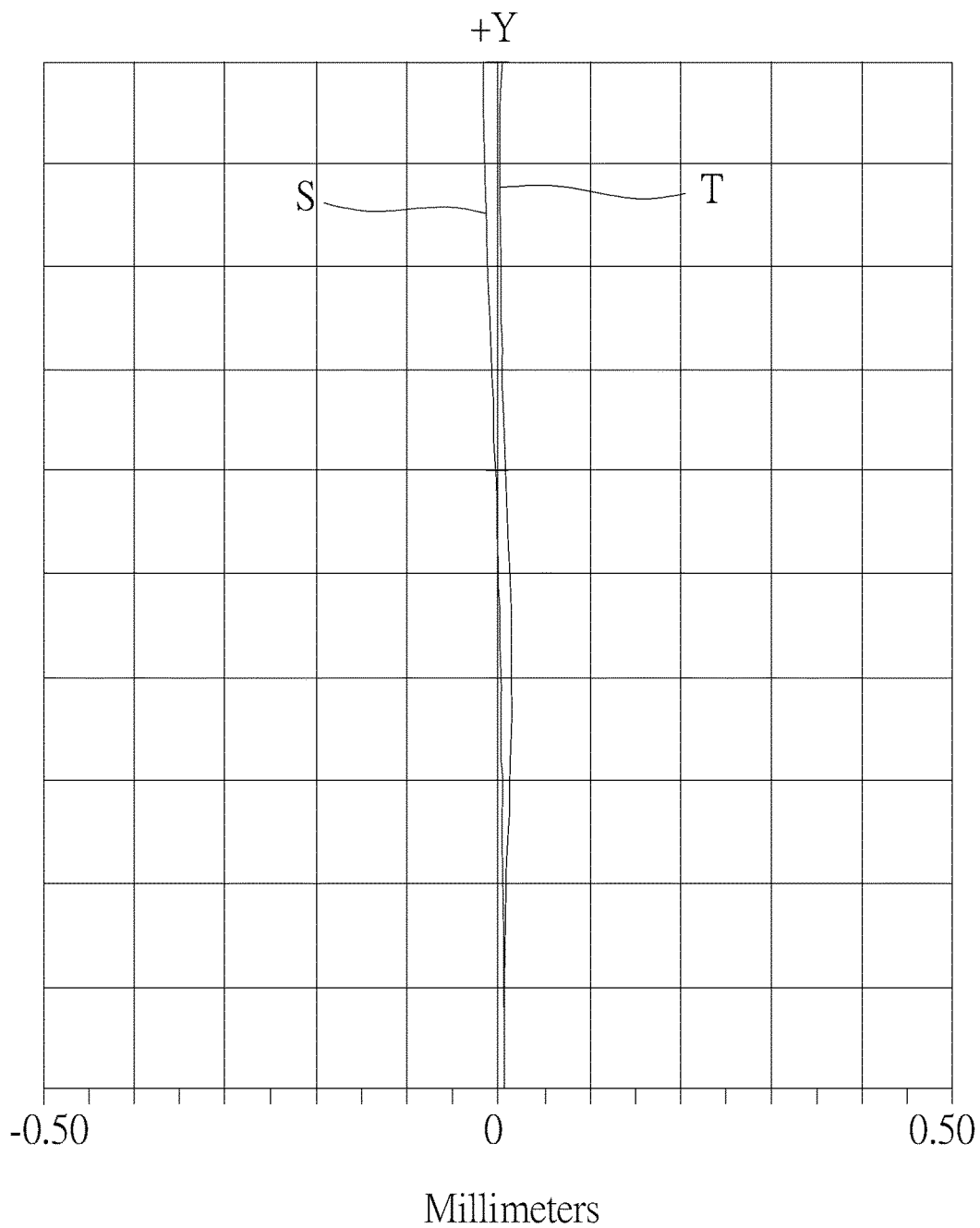
FIG. 1B is a diagram showing the astigmatic field curvature of the optical imaging lens according to the first embodiment of the present invention.
Figure 1C:
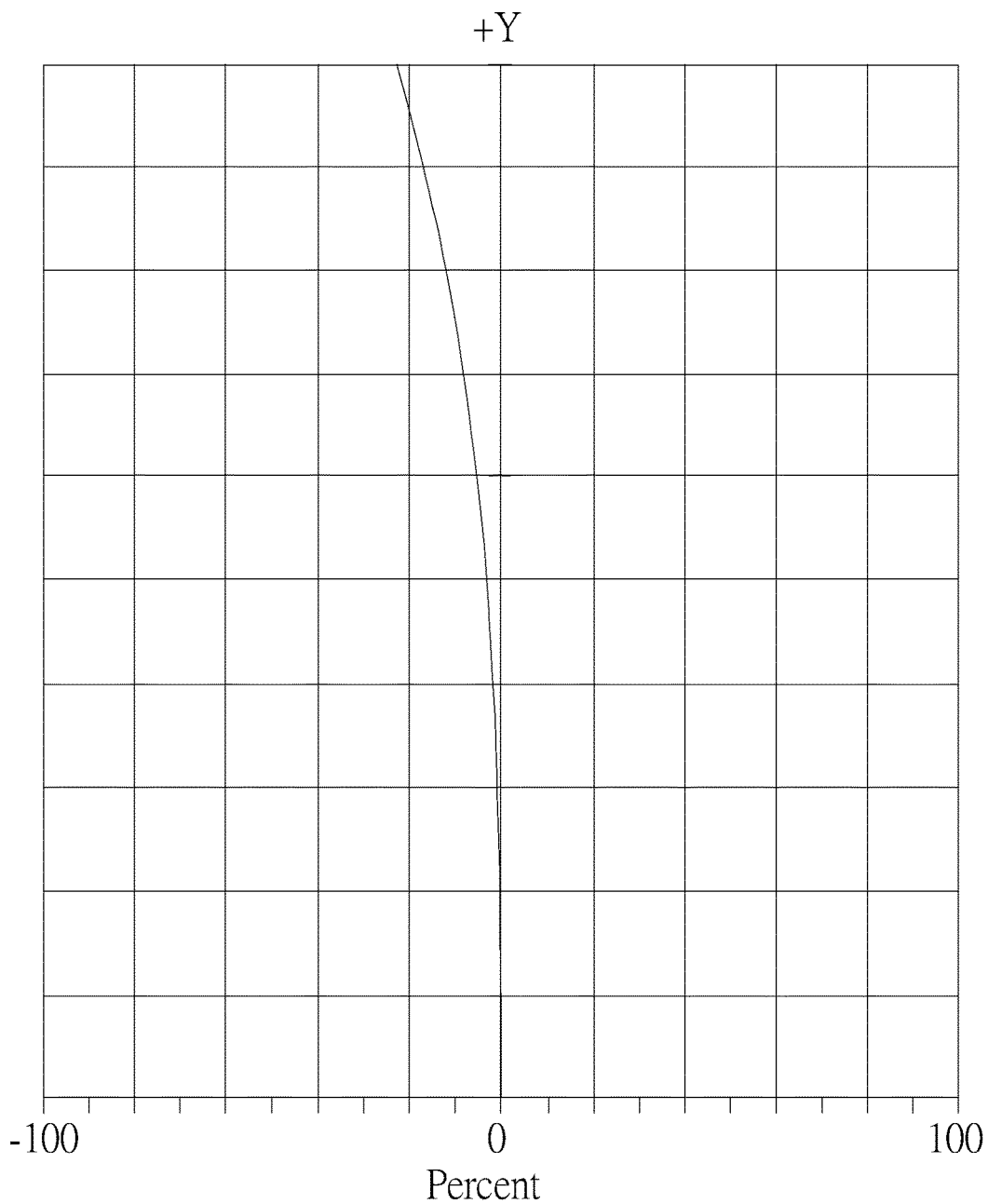
FIG. 1C is a diagram showing the distortion of the optical imaging lens according to the first embodiment of the present invention.
Figure 1D:
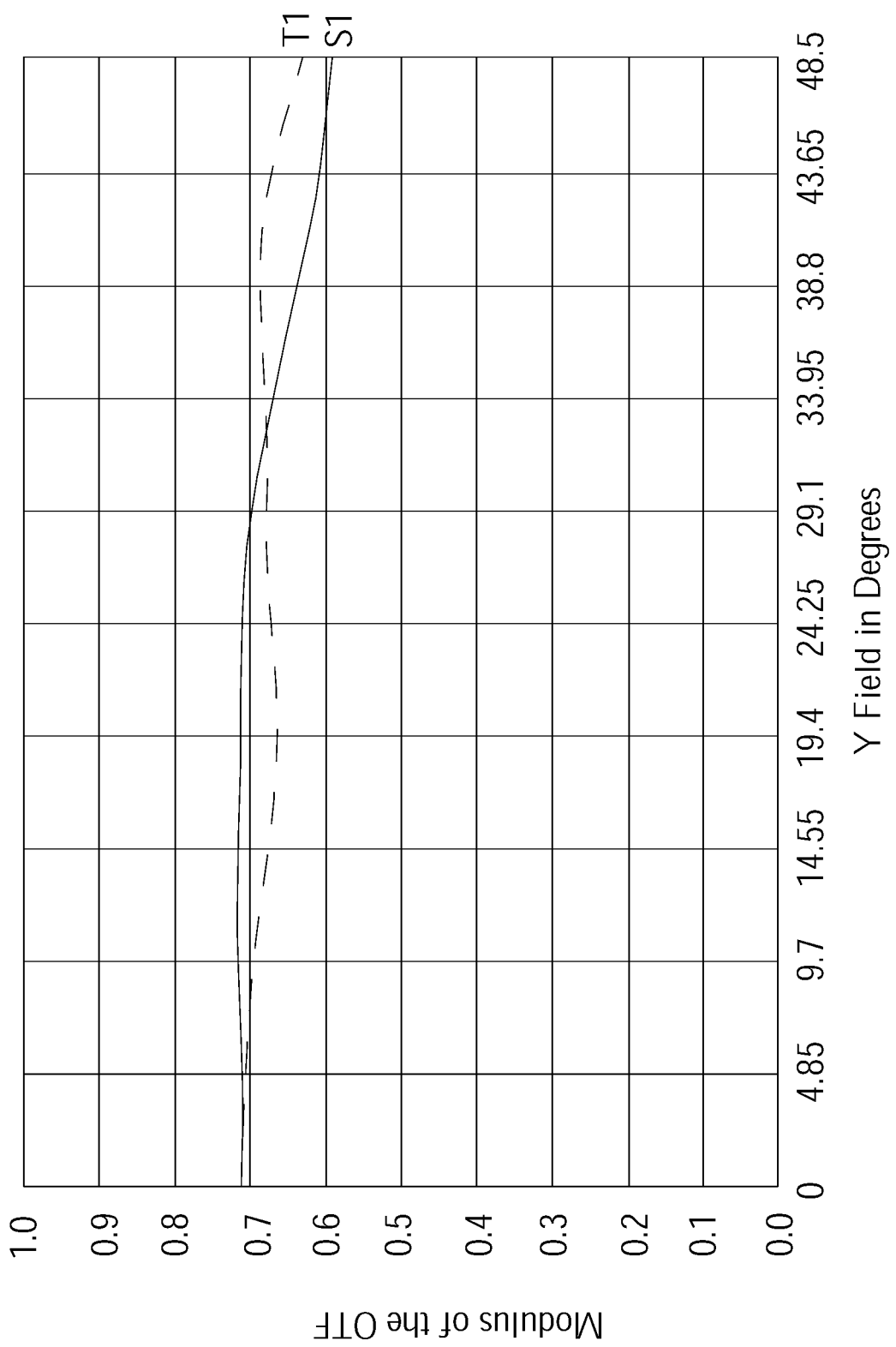
FIG. 1D is a diagram showing the modulus of the OTF of the optical imaging lens according to the first embodiment of the present invention.

Taking optical simulation data to verify the imaging quality of the optical imaging lens 100, wherein FIG. 1B is a diagram showing the astigmatic field curves according to the first embodiment; FIG. 1C is a diagram showing the distortion according to the first embodiment; FIG. 1D is a diagram showing the modulus of the OTF according to the first embodiment. In FIG. 1B, a curve S is data of a sagittal direction, and a curve T is data of a tangential direction. The graphics shown in FIG. 1C and FIG. 1D are within a standard range. In this way, the optical imaging lens 100 of the first embodiment could effectively enhance image quality and lower a distortion thereof.

Figure 2A:
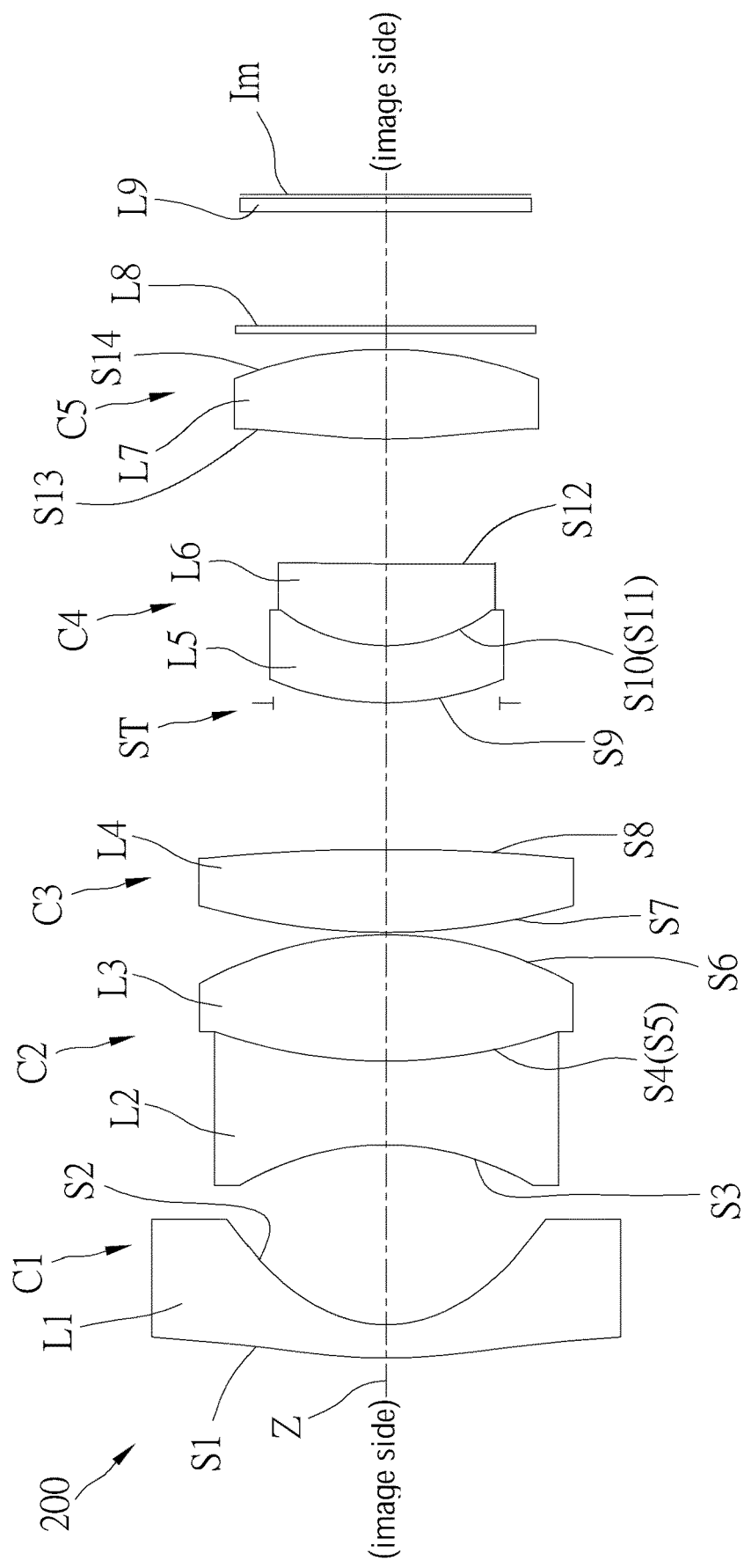
FIG. 2A is a schematic view of the optical imaging lens according to a second embodiment of the present invention.

An optical imaging lens 200 according to a second embodiment of the present invention is illustrated in FIG. 2A, which includes, in order along an optical axis Z from an object side to an image side, a first optical assembly C1, a second optical assembly C2, a third optical assembly C3, an aperture ST, a fourth optical assembly C4, and a fifth optical assembly C5. In the current embodiment, the second optical assembly C2 and the fourth optical assembly C4 are respectively a compound lens, while the first optical assembly C1, the third optical assembly C3, and the fifth optical assembly C5 are respectively a single lens.

The first optical assembly C1 has negative refractive power. In the current embodiment, the first optical assembly C1 is a single lens that includes a first lens L1, wherein the first lens L1 is a negative meniscus; an object-side surface S1 of the first lens L1 is a convex surface that is slightly convex toward the object side, and an image-side surface S2 of the first lens L1 is a concave surface toward the image side; the object-side surface S1, the image-side surface S2, or both of the object-side surface S1 and the image-side surface S2 of the first lens L1 are aspheric surfaces. As shown in FIG. 2A, both of the object-side surface S1 and the image-side surface S2 of the first lens L1 are aspheric surfaces, and a part of a surface of the first lens L1 toward the image side is recessed to form the image-side surface S2, and the optical axis Z passes through the object-side surface S1 and the image-side surface S2 of the first lens L1.

The second optical assembly C2 has positive refractive power. In the current embodiment, the second optical assembly C2 is a compound lens formed by adhering a second lens L2 and a third lens L3, wherein the second lens L2 is a biconcave lens with negative refractive power (i.e., both of an object-side surface S3 of the second lens L2 and an image-side surface S4 of the second lens L2 are concave surfaces). As shown in FIG. 2A, a part of a surface of the second lens L2 toward the object side is recessed to form the object-side surface S3, and a surface of the second lens L2 toward the image side is recessed to form the image-side surface S4, and the optical axis Z passes through the object-side surface S3 and the image-side surface S4 of the second lens L2.

The third lens L3 is a biconvex lens (i.e., both of an object-side surface S5 of the third lens L3 and an image-side surface S6 of the third lens L3 are convex surfaces) with positive refractive power. In the current embodiment, a part of a surface of the third lens L3 toward the object side is convex to form the object-side surface S5, and a surface of the third lens L3 toward the image side is convex to form the image-side surface S6, and the optical axis Z passes through the object-side surface S5 and the image-side surface S6 of the third lens L3, wherein the object-side surface S5 of the third lens L3 and the image-side surface S4 of the second lens L2 are adhered to form a same surface.

The third optical assembly C3 has positive refractive power. In the current embodiment, the third optical assembly C3 is a single lens that includes a fourth lens L4, wherein the fourth lens L4 is a biconvex lens (i.e., both of an object-side surface S7 of the fourth lens L4 and an image-side surface S8 of the fourth lens L4 are convex surfaces). As shown in FIG. 2A, the object-side surface S7 of the fourth lens L4 is convex toward the object side in an arc shape, and the image-side surface S8 of the fourth lens L4 is slightly convex toward the image side.

The fourth optical assembly C4 has positive refractive power. In the current embodiment, the fourth optical assembly C4 is a compound lens formed by adhering a fifth lens L5 and a sixth lens L6, wherein the fifth lens L5 is a negative meniscus; an object-side surface S9 of the fifth lens L5 is a convex surface toward the object side, and an image-side surface S10 of the fifth lens L5 is a concave surface toward the image side. As shown in FIG. 2A, a part of a surface of the fifth lens L5 toward the image side is recessed to form the image-side surface S10, and the optical axis Z passes through the object-side surface S9 and the image-side surface S10 of the fifth lens L5.

The sixth lens L6 is a positive meniscus, wherein a surface of the sixth lens L6 toward the object side is convex to form an object-side surface S11, and a surface of the sixth lens L6 toward the image side is slightly recessed to form an image-side surface S12. The object-side surface S11 of the sixth lens L6 and the image-side surface S10 of the fifth lens L5 are adhered to form a same surface.

The fifth optical assembly C5 has positive refractive power. In the current embodiment, the fifth optical assembly C5 is a single lens that includes a seventh lens L7, wherein the seventh lens L7 is a biconvex lens (i.e., both of an object-side surface S13 of the seventh lens L7 and an image-side surface S14 of the seventh lens L7 are convex surfaces) with positive refractive power; the object-side surface S13, the image-side surface S14, or both of the object-side surface S13 and the image-side surface S14 of the seventh lens L7 are aspheric surfaces. As shown in FIG. 2A, both of the object-side surface S13 and the image-side surface S14 of the seventh lens L7 are aspheric surfaces, and a surface of the seventh lens L7 toward the object side is slightly convex to form the object-side surface S13, and a surface of the seventh lens L7 toward the image side is convex to form the image-side surface S14.

Additionally, the optical imaging lens 200 further includes an infrared filter L8 and a protective glass L9, wherein the infrared filter L8 is disposed between the seventh lens L7 and the protective glass L9 and is closer to the image-side surface S14 of the seventh lens L7 than the protective glass L9, thereby filtering out excess infrared rays in an image light passing through the optical imaging lens 100 to improve imaging quality. The protective glass L9 for protecting the infrared filter L8 is disposed between the infrared filter L8 and an image plane Im of the optical imaging lens 200 and is closer to the image plane Im than the infrared filter L8.

In order to keep the optical imaging lens 200 in good optical performance and high imaging quality, the optical imaging lens 200 further satisfies:

$$-0.48 > f1/F > -0.53; \tag{1}$$

$$0.18 > f23/F > 0.13;\ -0.35 > f2/F > -0.42;\ 0.35 > f3/F > 0.25; \tag{2}$$

$$0.35 > f4/F > 0.3; \tag{3}$$

$$0.15 > f56/F > 0.05;\ -0.05 > f5/F > -0.15;\ 0.3 > f6/F > 0.2; \tag{4}$$

$$0.37 > f7/F > 0.3; \tag{5}$$

wherein F is a focal length of the optical imaging lens 200; f1 is a focal length of the first lens L1 of the first optical assembly C1; f23 is a focal length of the second optical assembly C2; f2 is a focal length of the second lens L2 of the second optical assembly C2; f3 is a focal length of the third lens L3 of the second optical assembly C2; f4 is a focal length of the fourth lens L4 of the third optical assembly C3; f56 is a focal length of the fourth optical assembly C4; f5 is a focal length of the fifth lens L5 of the fourth optical assembly C4; f6 is a focal length of the sixth lens L6 of the fourth optical assembly C4; f7 is a focal length of the seventh lens L7 of the fifth optical assembly C5.

Parameters of the optical imaging lens 200 of the second embodiment of the present invention are listed in following Table 3, including the focal length F of the optical imaging lens 200 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens, the focal length (cemented focal length) of the second optical assembly C2, and the focal length (cemented focal length) of the fourth optical assembly C4, wherein a unit of the focal length, the radius of curvature, and the distance is millimeter (mm).

TABLE 3

F = 5.68 mm; Fno = 1.75; HFOV = 100 deg

| Surface | R(mm) | D(mm) | Nd | Focal length | Cemented focal length | Note |
|---|---|---|---|---|---|---|
| S1 | 22.25 | 1.4 | 1.52 | −11.36 | 0 | L1 |
| S2 | 4.56 | 6.92 | 1 | 0 | 0 | |
| S3 | −8.07 | 3.09 | 1.88 | −15.22 | 38.79 | L2 |
| S4, S5 | 14.69 | 4.81 | 1.7 | 20.64 | 0 | L3 |
| S6 | −11.06 | 0.1 | 1 | 0 | 0 | |
| S7 | 18.59 | 3.19 | 1.89 | 17.22 | 0 | L4 |
| S8 | −86.96 | 5.62 | 1 | 0 | 0 | |
| ST | Infinity | 0.01 | 1 | 0 | 0 | ST |
| S9 | 10.27 | 2.2 | 1.96 | −43.37 | 47.87 | L5 |
| S10, S11 | 5.93 | 3.12 | 1.5 | 23.6 | 0 | L6 |
| S12 | 193.86 | 4.75 | 1 | 0 | 0 | |
| S13 | 19.16 | 3.42 | 1.5 | 17.88 | 0 | L7 |
| S14 | −16.71 | 0.64 | 1 | 0 | 0 | |
| S15 | Infinity | 0.3 | 1.52 | 0 | 0 | Infrared filter L8 |
| S16 | Infinity | 4.36 | 1 | 0 | 0 | |
| S17 | Infinity | 0.5 | 1.52 | 0 | 0 | Protective glass L9 |
| S18 | Infinity | 0.16 | 1 | 0 | 0 | |
| Im | Infinity | | | | | Im |

It can be seen from Table 3 that, in the second embodiment, the focal length (F) of the optical imaging lens 200 is 5.68 mm, and the Fno is 1.75, and the HFOV is 100 degrees, wherein f1=−11.36 mm; f2=−15.22 mm; f3=20.64 mm; f4=17.22 mm; f5=−43.37 mm; f6=23.6 mm; f7=17.88 mm; f23=38.79 mm; f56=47.87 mm.

Additionally, based on the above detailed parameters, detailed values of the aforementioned conditional formula in the second embodiment are as follows: f1/F=−0.5; f23/F=0.15; f2/F=−0.37; f3/F=0.28; f4/F=0.33; f56/F=0.12; f5/F=−0.13; f6/F=0.24; f7/F=0.32.

With the aforementioned design, the first optical assembly C1 to the fifth optical assembly C5 satisfy the aforementioned conditions (1) to (5) of the optical imaging lens 200.

Moreover, an aspheric surface contour shape Z of each of the object-side surface S1 of the first lens L1, and the image-side surface S2 of the first lens L1, and the object-side surface S13 of the seventh lens L7, and the image-side surface S14 of the seventh lens L7 of the optical imaging lens 200 according to the second embodiment could be obtained by following formula:

$$Z = \frac{ch^2}{1+\sqrt{1-(1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S1 of the first lens L1, and the image-side surface S2 of the first lens L1, and the object-side surface S13 of the seventh lens L7, and the image-side surface S14 of the seventh lens L7 of the optical imaging lens 200 according to the second embodiment and the different order coefficient of A2, A4, A6, A8, A10, A12, A14, and A16 are listed in following Table 4:

TABLE 4

| Surface | S1 | S2 | S13 | S14 |
|---|---|---|---|---|
| k | 3.80E−01 | −1.02E+00 | 2.76E+00 | 2.59E−01 |
| A2 | 0 | 0 | 0 | 0 |
| A4 | −1.25E−04 | 5.63E−04 | −4.76E−04 | 3.87E−05 |
| A6 | −2.98E−06 | 2.42E−06 | 7.28E−06 | −3.44E−06 |
| A8 | 6.27E−08 | −4.01E−07 | −8.59E−07 | −2.83E−07 |
| A10 | −5.64E−10 | 8.40E−09 | 4.27E−08 | 1.26E−08 |
| A12 | 2.08E−12 | 2.12E−11 | −1.20E−09 | −3.36E−10 |
| A14 | 0.00E+00 | −3.05E−12 | 1.52E−11 | 4.40E−12 |
| A16 | 0 | 0 | 0 | 0 |

Figure 2B:
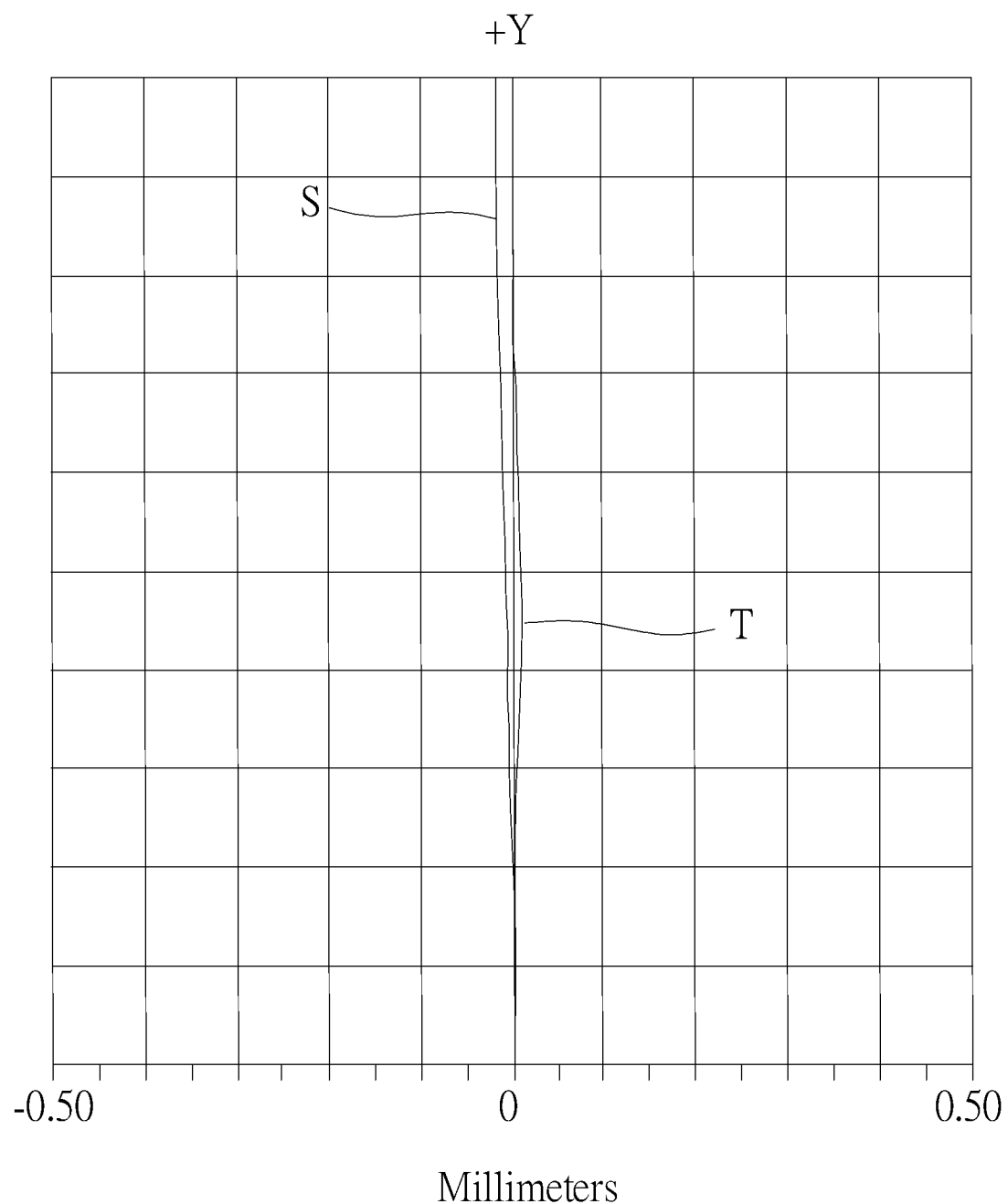
FIG. 2B is a diagram showing the astigmatic field curvature of the optical imaging lens according to the second embodiment of the present invention.
Figure 2C:
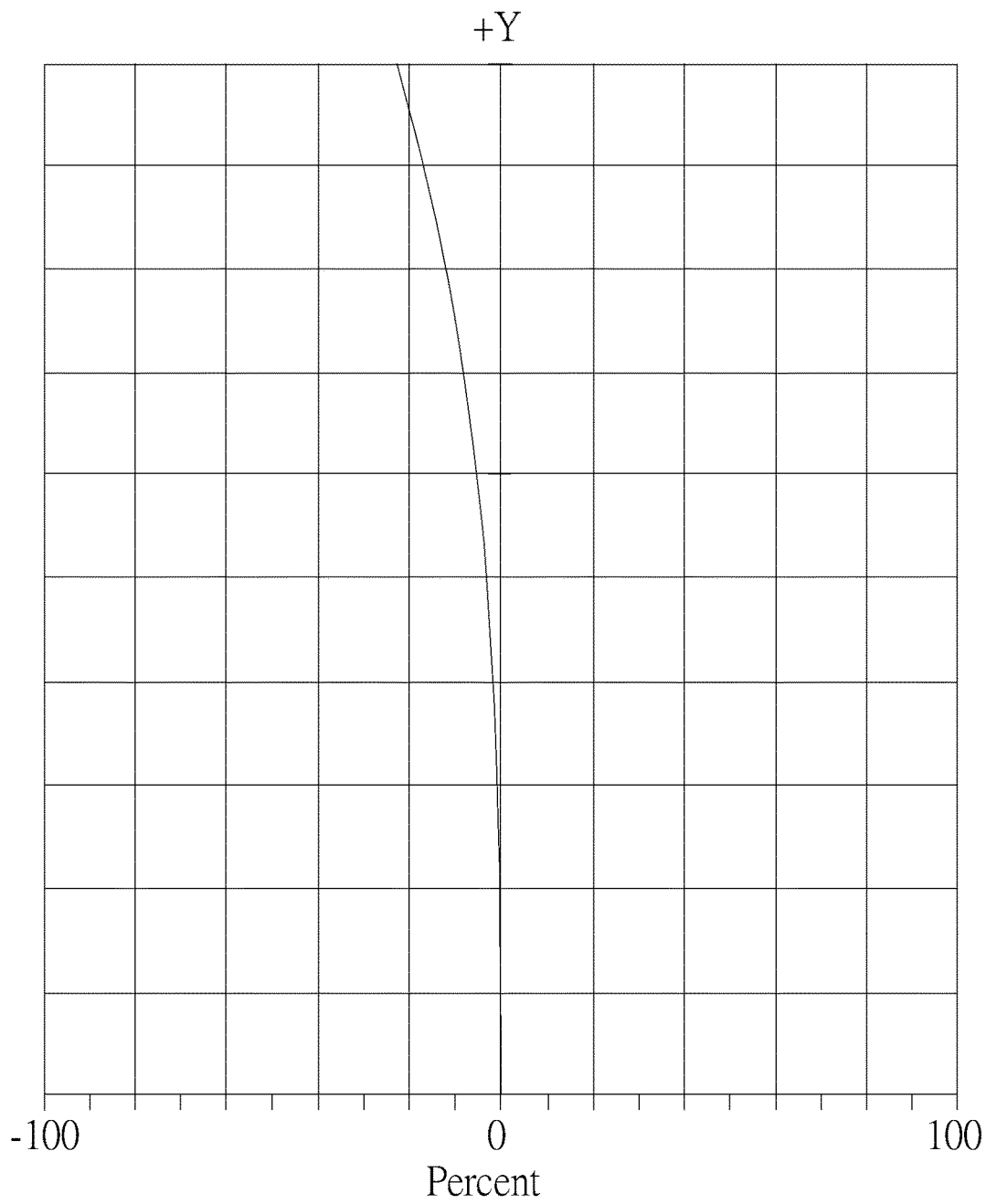
FIG. 2C is a diagram showing the distortion of the optical imaging lens according to the second embodiment of the present invention.
Figure 2D:
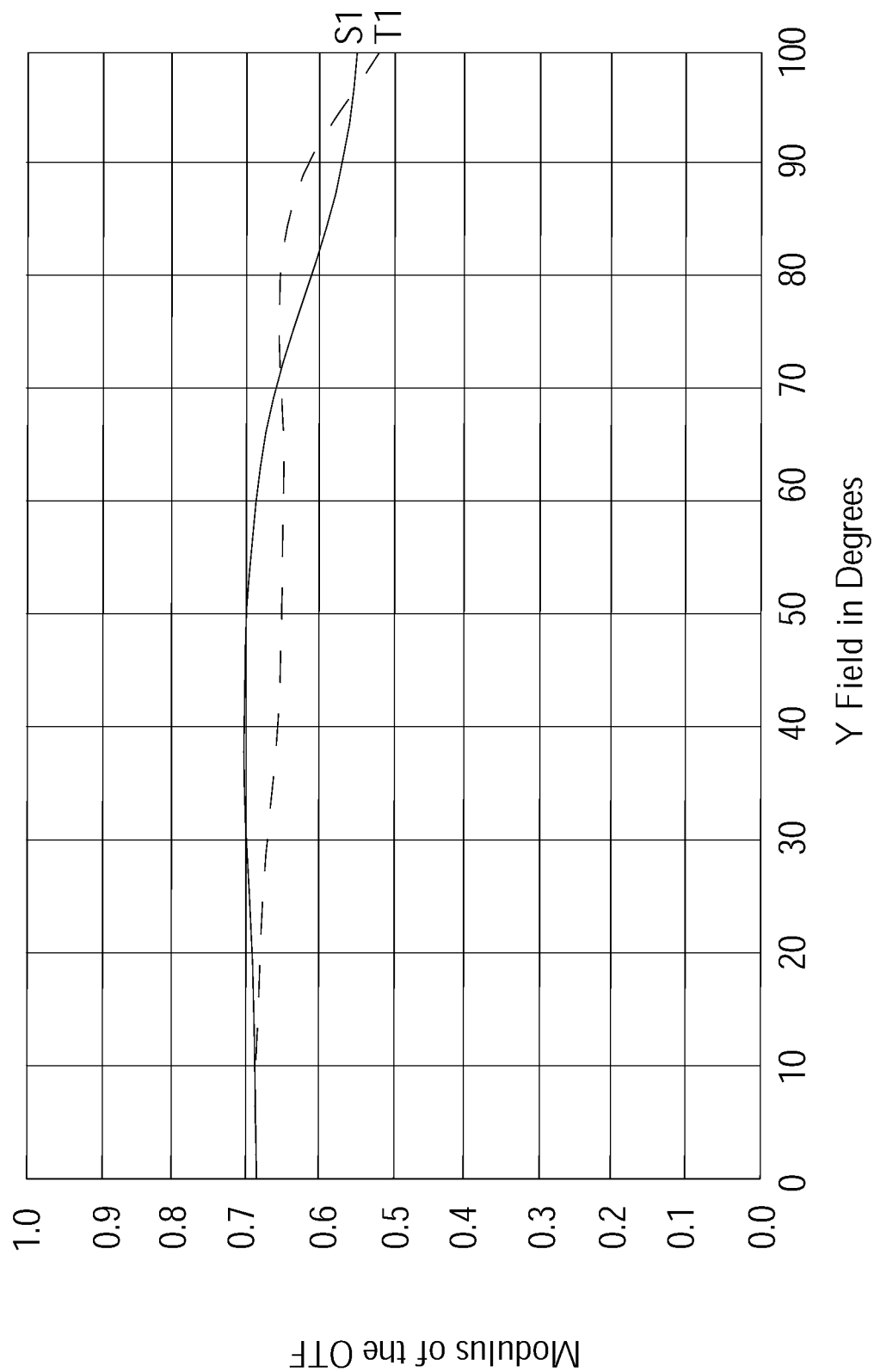
FIG. 2D is a diagram showing the modulus of the OTF of the optical imaging lens according to the second embodiment of the present invention.

Taking optical simulation data to verify the imaging quality of the optical imaging lens 200, wherein FIG. 2B is a diagram showing the astigmatic field curves according to the second embodiment; FIG. 2C is a diagram showing the distortion according to the second embodiment; FIG. 2D is a diagram showing the modulus of the OTF according to the second embodiment. In FIG. 2B, a curve S is data of a sagittal direction, and a curve T is data of a tangential direction. The graphics shown in FIG. 2C and FIG. 2D are within a standard range. In this way, the optical imaging lens 200 of the second embodiment could effectively enhance image quality and lower a distortion thereof.

Figure 3A:
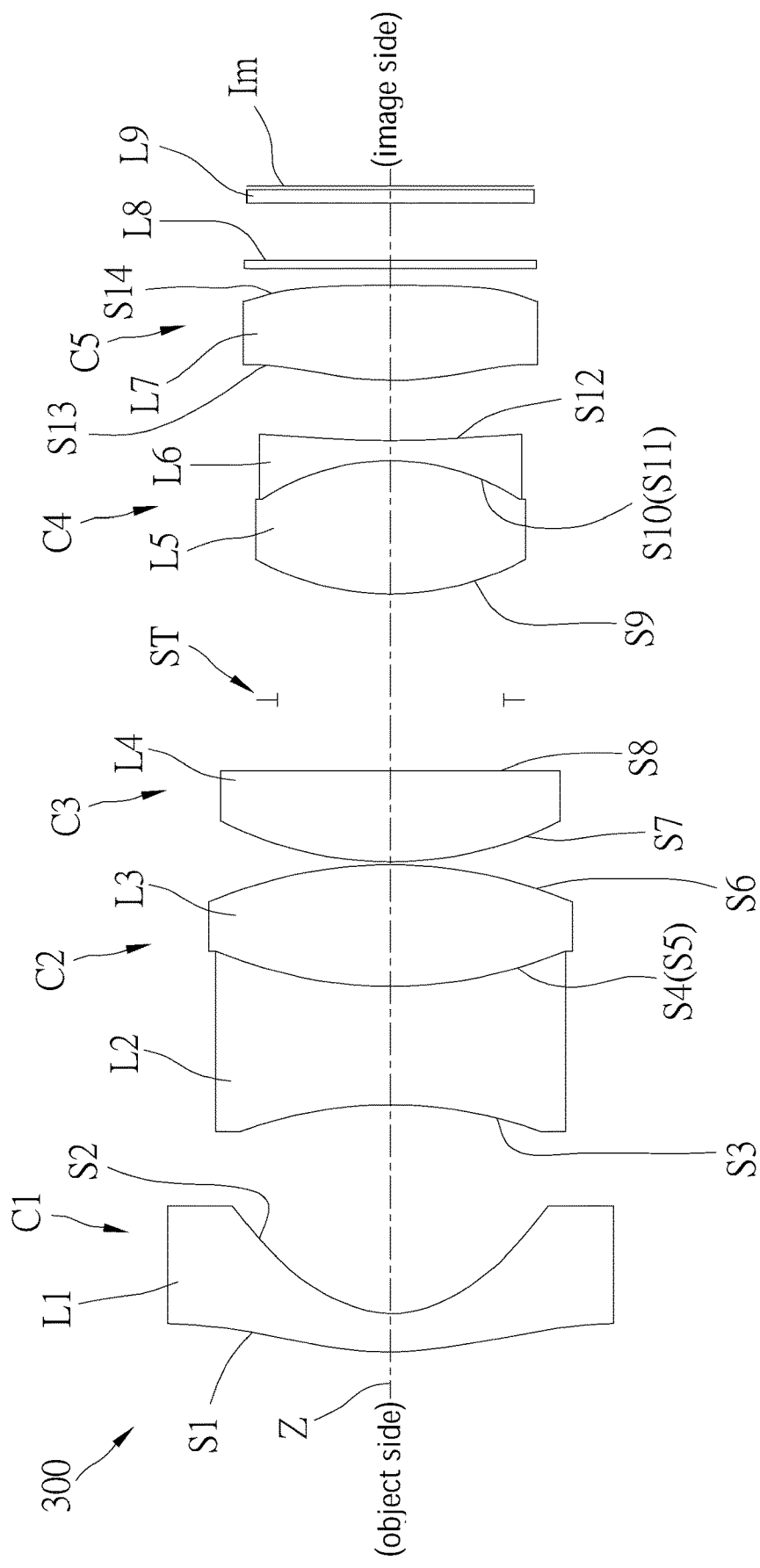
FIG. 3A is a schematic view of the optical imaging lens according to a third embodiment of the present invention.

An optical imaging lens 300 according to a third embodiment of the present invention is illustrated in FIG. 3A, which includes, in order along an optical axis Z from an object side to an image side, a first optical assembly C1, a second optical assembly C2, a third optical assembly C3, an aperture ST, a fourth optical assembly C4, and a fifth optical assembly C5. In the current embodiment, the second optical assembly C2 and the fourth optical assembly C4 are respectively a compound lens, while the first optical assembly C1, the third optical assembly C3, and the fifth optical assembly C5 are respectively a single lens.

The first optical assembly C1 has negative refractive power. In the current embodiment, the first optical assembly C1 is a single lens that includes a first lens L1, wherein the first lens L1 is a negative meniscus; an object-side surface S1 of the first lens L1 is a convex surface that is slightly convex toward the object side, and an image-side surface S2 of the first lens L1 is a concave surface toward the image side; the object-side surface S1, the image-side surface S2, or both of the object-side surface S1 and the image-side surface S2 of the first lens L1 are aspheric surfaces. As shown in FIG. 3A, both of the object-side surface S1 and the image-side surface S2 of the first lens L1 are aspheric surfaces, and a part of a surface of the first lens L1 toward the image side is recessed to form the image-side surface S2, and the optical axis Z passes through the object-side surface S1 and the image-side surface S2 of the first lens L1.

The second optical assembly C2 has positive refractive power. In the current embodiment, the second optical assembly C2 is a compound lens formed by adhering a second lens L2 and a third lens L3, wherein the second lens L2 is a biconcave lens with negative refractive power (i.e., both of an object-side surface S3 of the second lens L2 and an image-side surface S4 of the second lens L2 are concave surfaces). As shown in FIG. 3A, a part of a surface of the second lens L2 toward the object side is recessed to form the object-side surface S3, and a surface of the second lens L2 toward the image side is recessed to form the image-side surface S4, and the optical axis Z passes through the object-side surface S3 and the image-side surface S4 of the second lens L2.

The third lens L3 is a biconvex lens (i.e., both of an object-side surface S5 of the third lens L3 and an image-side surface S6 of the third lens L3 are convex surfaces) with positive refractive power. In the current embodiment, a part of a surface of the third lens L3 toward the object side is convex to form the object-side surface S5, and a surface of the third lens L3 toward the image side is convex to form the image-side surface S6, and the optical axis Z passes through the object-side surface S5 and the image-side surface S6 of the third lens L3, wherein the object-side surface S5 of the third lens L3 and the image-side surface S4 of the second lens L2 are adhered to form a same surface.

The third optical assembly C3 has positive refractive power. In the current embodiment, the third optical assembly C3 is a single lens that includes a fourth lens L4, wherein the fourth lens L4 is a plano-convex lens; an object-side surface S7 of the fourth lens L4 is a convex surface toward the object side, and an image-side surface S8 of the fourth lens L4 is a flat surface.

The fourth optical assembly C4 has positive refractive power. In the current embodiment, the fourth optical assembly C4 is a compound lens formed by adhering a fifth lens L5 and a sixth lens L6, wherein the fifth lens L5 is a biconvex lens (i.e., both of an object-side surface S9 of the fifth lens L5 and an image-side surface S10 of the fifth lens L5 are convex surfaces) with negative refractive power.

The sixth lens L6 is a biconcave lens with positive refractive power (i.e., both of an object-side surface S11 of the sixth lens L6 and an image-side surface S12 of the sixth lens L6 are concave surfaces). In the current embodiment, a surface of the sixth lens L6 toward the object side is recessed to form the object-side surface S11, and a surface of the sixth lens L6 toward the image side is slightly recessed to form the image-side surface S12, wherein the object-side surface S11 of the sixth lens L6 and the image-side surface S10 of the fifth lens L5 are adhered to form a same surface.

The fifth optical assembly C5 has positive refractive power. In the current embodiment, the fifth optical assembly C5 is a single lens that includes a seventh lens L7, wherein the seventh lens L7 is a biconvex lens (i.e., both of an object-side surface S13 of the seventh lens L7 and an image-side surface S14 of the seventh lens L7 are convex surfaces) with positive refractive power; the object-side surface S13, the image-side surface S14, or both of the object-side surface S13 and the image-side surface S14 of the seventh lens L7 are aspheric surfaces. As shown in FIG. 3A, both of the object-side surface S13 and the image-side surface S14 of the seventh lens L7 are aspheric surfaces, and a surface of the seventh lens L7 toward the object side is slightly convex to form the object-side surface S13, and a surface of the seventh lens L7 toward the image side is convex to form the image-side surface S14.

Additionally, the optical imaging lens 300 further includes an infrared filter L8 and a protective glass L9, wherein the infrared filter L8 is disposed between the seventh lens L7 and the protective glass L9 and is closer to the image-side surface S14 of the seventh lens L7 than the protective glass L9. The protective glass L9 for protecting the infrared filter L8 is disposed between the infrared filter L8 and an image plane Im of the optical imaging lens 300 and is closer to the image plane Im than the infrared filter L8.

In order to keep the optical imaging lens 300 in good optical performance and high imaging quality, the optical imaging lens 300 further satisfies:

$$-0.48 > f1/F > -0.53; \quad (1)$$

$$0.18 > f23/F > 0.13; \; -0.35 > f2/F > -0.42; \; 0.35 > f3/F > 0.25; \quad (2)$$

$$0.35 > f4/F > 0.3; \quad (3)$$

$$0.15 > f56/F > 0.05; \; -0.05 > f5/F > -0.15; \; 0.3 > f6/F > 0.2; \quad (4)$$

$$0.37 > f7/F > 0.3; \quad (5)$$

wherein F is a focal length of the optical imaging lens 300; f1 is a focal length of the first lens L1 of the first optical assembly C1; f23 is a focal length of the second optical assembly C2; f2 is a focal length of the second lens L2 of the second optical assembly C2; f3 is a focal length of the third lens L3 of the second optical assembly C2; f4 is a focal length of the fourth lens L4 of the third optical assembly C3; f56 is a focal length of the fourth optical assembly C4; f5 is a focal length of the fifth lens L5 of the fourth optical assembly C4; f6 is a focal length of the sixth lens L6 of the fourth optical assembly C4; f7 is a focal length of the seventh lens L7 of the fifth optical assembly C5.

Parameters of the optical imaging lens 300 of the third embodiment of the present invention are listed in following Table 5, including the focal length F of the optical imaging lens 300 (also called an effective focal length (EFL)), a F-number (Fno), a maximal field of view (HFOV), a radius of curvature (R) of each lens, a distance (D) between each surface and the next surface on the optical axis Z, a refractive index (Nd) of each lens, the focal length of each lens, the focal length (cemented focal length) of the second optical assembly C2, and the focal length (cemented focal length) of the fourth optical assembly C4, wherein a unit of the focal length, the radius of curvature, and the distance is millimeter (mm).

TABLE 5

F = 5.68 mm; Fno = 1.75; HFOV = 100 deg

| Surface | R(mm) | D(mm) | Nd | Focal length | Cemented focal length | Note |
|---|---|---|---|---|---|---|
| S1 | 12.74 | 1.47 | 1.69 | −11.36 | 0 | L1 |
| S2 | 3.96 | 7.98 | 1 | 0 | 0 | |
| S3 | −14 | 4.54 | 1.91 | −15.22 | 38.79 | L2 |
| S4, S5 | 14.97 | 4.64 | 1.88 | 20.64 | 0 | L3 |
| S6 | −15.97 | 0.1 | 1 | 0 | 0 | |
| S7 | 12.09 | 3.5 | 1.7 | 17.22 | 0 | L4 |
| S8 | Infinity | 2.69 | 1 | 0 | 0 | |
| ST | Infinity | 4.07 | 1 | 0 | 0 | ST |
| S9 | 10.75 | 5.08 | 1.5 | −43.37 | 47.87 | L5 |
| S10, S11 | −8.29 | 0.8 | 1.81 | 23.6 | 0 | L6 |
| S12 | 46.81 | 2.29 | 1 | 0 | 0 | |
| S13 | 12 | 3.66 | 1.5 | 17.88 | 0 | L7 |
| S14 | −49 | 0.64 | 1 | 0 | 0 | |
| S15 | Infinity | 0.3 | 1.52 | 0 | 0 | Infrared filter L8 |
| S16 | Infinity | 2.2 | 1 | 0 | 0 | |
| S17 | Infinity | 0.5 | 1.52 | 0 | 0 | Protective glass L9 |
| S18 | Infinity | 0.16 | 1 | 0 | 0 | |
| Im | Infinity | | | | | Im |

It can be seen from Table 5 that, in the current embodiment, the focal length F of the optical imaging lens 300 is 5.68 mm, and the Fno is 1.75, and the HFOV is 100 degrees, wherein f1=−11.36 mm; f2=−15.22 mm; f3=20.64 mm; f4=17.22 mm; f5=−43.37 mm; f6=23.6 mm; f7=17.88 mm; f23=38.79 mm; f56=47.87 mm.

Additionally, based on the above detailed parameters, detailed values of the aforementioned conditional formula in the third embodiment are as follows: f1/F=−0.5; f23/F=0.15; f2/F=−0.37; f3/F=0.28; f4/F=0.33; f56/F=0.12; f5/F=−0.13; f6/F=0.24; f7/F=0.32.

With the aforementioned design, the first optical assembly C1 to the fifth optical assembly C5 satisfy the aforementioned conditions (1) to (5) of the optical imaging lens 300.

Moreover, an aspheric surface contour shape Z of each of the object-side surface S1 of the first lens L1, and the image-side surface S2 of the first lens L1, and the object-side surface S13 of the seventh lens L7, and the image-side surface S14 of the seventh lens L7 of the optical imaging lens 300 according to the third embodiment could be obtained by following formula:

$$Z = \frac{ch^2}{1+\sqrt{1-(1+k)c^2h^2}} + A_2h^2 + A_4h^4 + A_6h^6 + A_8h^8 + A_{10}h^{10} + A_{12}h^{12} + A_{14}h^{14} + A_{16}h^{16}$$

wherein Z is aspheric surface contour shape; c is reciprocal of radius of curvature; h is half the off-axis height of the surface; k is conic constant; A2, A4, A6, A8, A10, A12, A14, and A16 respectively represents different order coefficient of h.

The conic constant k of each of the object-side surface S1 of the first lens L1, and the image-side surface S2 of the first lens L1, and the object-side surface S13 of the seventh lens L7, and the image-side surface S14 of the seventh lens L7 of the optical imaging lens 300 according to the third embodiment and the different order coefficient of A2, A4, A6, A8, A10, A12, A14, and A16 are listed in following Table 6:

TABLE 6

| Surface | S1 | S2 | S13 | S14 |
|---|---|---|---|---|
| k | −7.94E−01 | −1.71E+00 | 1.66E+00 | 0.00E+00 |
| A2 | 0 | 0 | 0 | 0 |
| A4 | −6.84E−04 | 1.36E−03 | −7.93E−04 | 3.55E−04 |
| A6 | 5.82E−06 | −3.08E−05 | −1.84E−05 | −5.48E−05 |
| A8 | −3.09E−08 | 5.00E−07 | −2.74E−08 | 1.21E−06 |
| A10 | 8.66E−11 | −2.09E−10 | −2.40E−09 | −1.45E−08 |
| A12 | −1.17E−13 | −7.56E−11 | 2.97E−10 | 2.46E−10 |
| A14 | −6.23E−16 | 0.00E+00 | 0 | 0 |
| A16 | 0 | 0 | 0 | 0 |

Figure 3B:
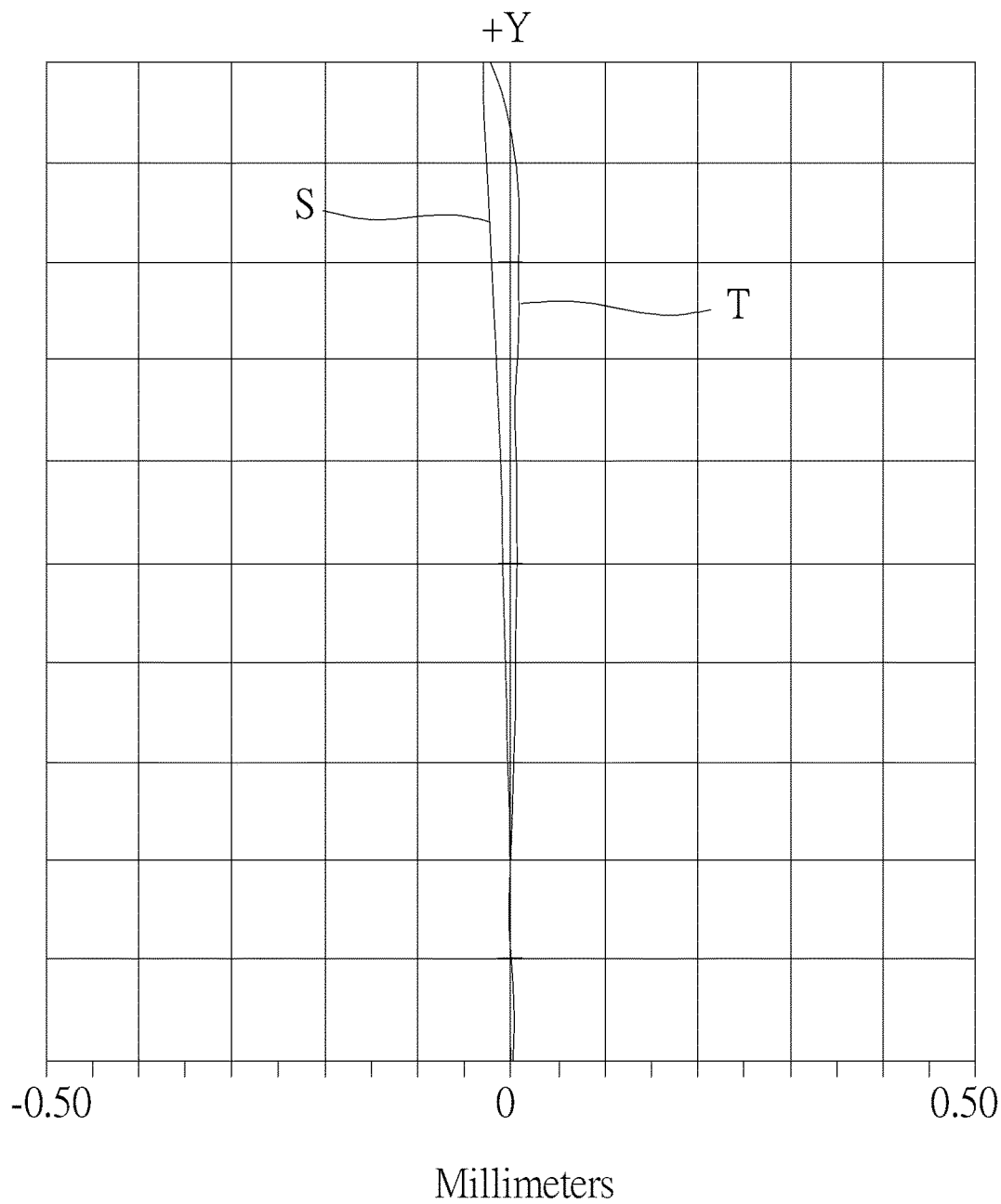
FIG. 3B is a diagram showing the astigmatic field curvature of the optical imaging lens according to the third embodiment of the present invention.
Figure 3C:
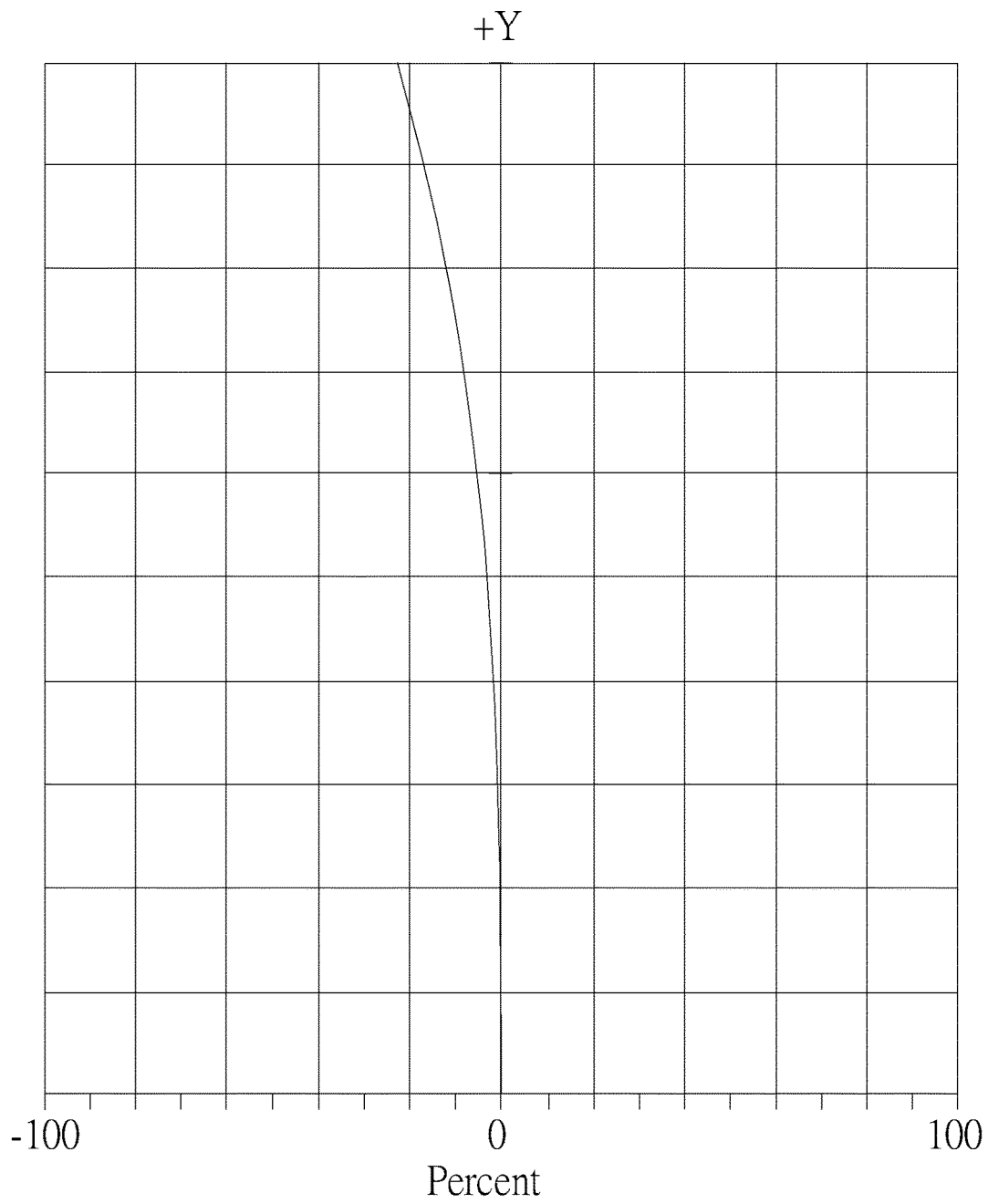
FIG. 3C is a diagram showing the distortion of the optical imaging lens according to the third embodiment of the present invention.
Figure 3D:
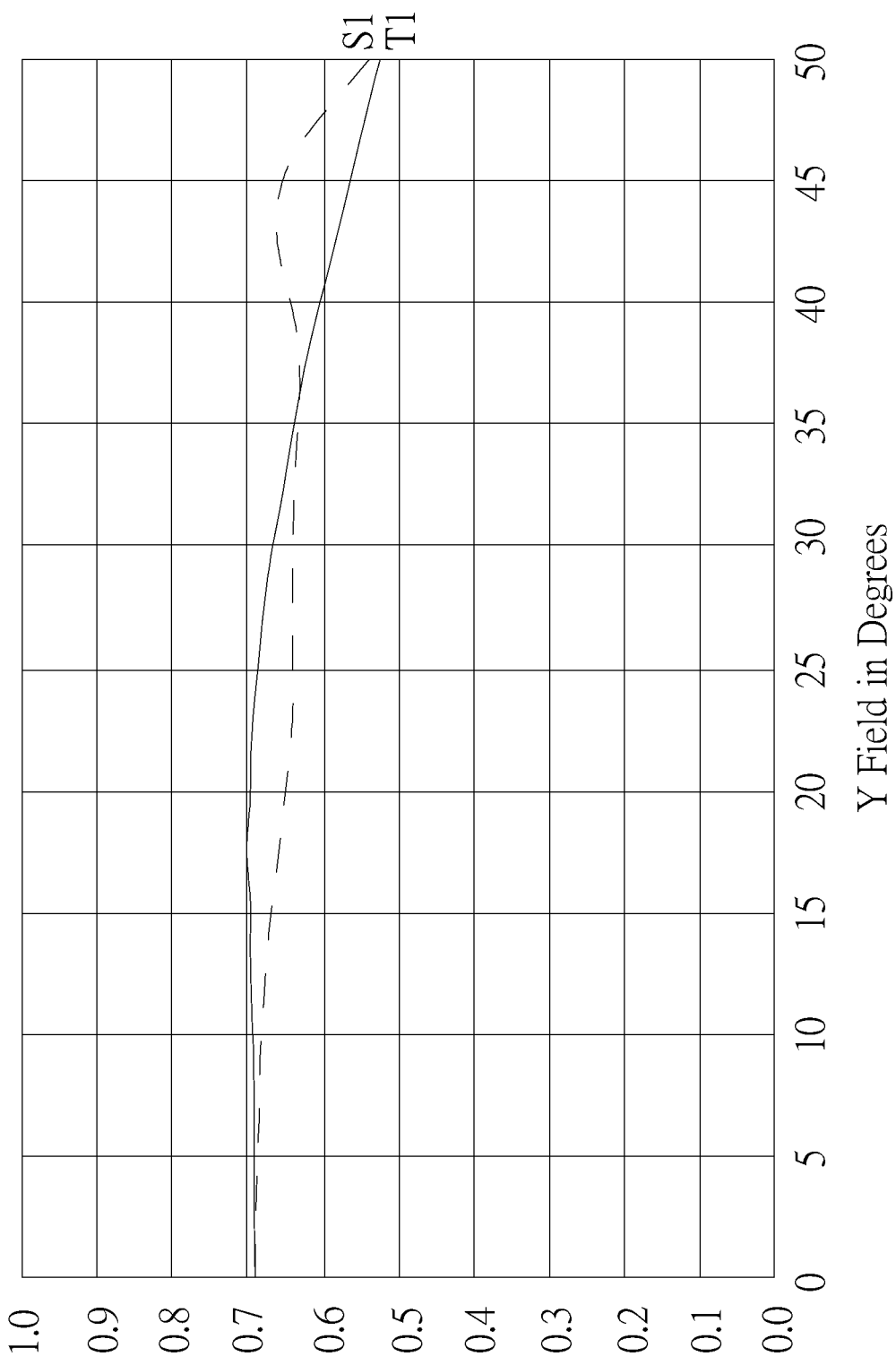
FIG. 3D is a diagram showing the modulus of the OTF of the optical imaging lens according to the third embodiment of the present invention.

Taking optical simulation data to verify the imaging quality of the optical imaging lens 300, wherein FIG. 3B is a diagram showing the astigmatic field curves according to the third embodiment; FIG. 3C is a diagram showing the distortion according to the third embodiment; FIG. 3D is a diagram showing the modulus of the OTF according to the third embodiment. In FIG. 3B, a curve S is data of a sagittal direction, and a curve T is data of a tangential direction. The graphics shown in FIG. 3C and FIG. 3D are within a standard range. In this way, the optical imaging lens 300 of the third embodiment could effectively enhance image quality and lower a distortion thereof.

It must be pointed out that the embodiments described above are only some preferred embodiments of the present invention. It is noted that, the parameters listed in Tables are not a limitation of the present invention. All equivalent structures which employ the concepts disclosed in this specification and the appended claims should fall within the scope of the present invention.

What is claimed is:

1. An optical imaging lens, in order from an object side to an image side along an optical axis, comprising:
   a first lens having negative refractive power, wherein an object-side surface of the first lens is a convex surface, and an image-side surface of the first lens is a concave surface; the object-side surface of the first lens and/or the image-side surface of the first lens are/is an aspheric surface;
   a second lens, which is a biconcave lens with negative refractive power;
   a third lens, which is a biconvex lens with positive refractive power, wherein an object-side surface of the third lens and an image-side surface of the second lens are adhered to form a compound lens with positive refractive power;
   a fourth lens having positive refractive power, wherein an object-side surface of the fourth lens is a convex surface;
   an aperture;
   a fifth lens having negative refractive power, wherein an object-side surface of the fifth lens is a convex surface;
   a sixth lens having positive refractive power; and
   a seventh lens, which is a biconvex lens with positive refractive power, wherein an object-side surface of the seventh lens and/or an image-side surface of the seventh lens are/is an aspheric surface, wherein the optical imaging lens satisfies: −0.35>f2/F>−0.42, wherein F is a focal length of the optical imaging lens; f2 is a focal length of the second lens.

2. The optical imaging lens as claimed in claim 1, wherein both of the object-side surface of the first lens and the image-side surface of the first lens are aspheric surfaces.

3. The optical imaging lens as claimed in claim 1, wherein both of the object-side surface and the image-side surface of the seventh lens are aspheric surfaces.

4. The optical imaging lens as claimed in claim 1, wherein the optical imaging lens satisfies: −0.48>f1/F>−0.53, wherein F is a focal length of the optical imaging lens; f1 is a focal length of the first lens.

5. The optical imaging lens as claimed in claim 1, wherein the optical imaging lens satisfies: 0.18>f23/F>0.13, wherein F is a focal length of the optical imaging lens; f23 is a focal length of the compound lens formed by adhering the second lens and the third lens.

6. An optical imaging lens, in order from an object side to an image side along an optical axis, comprising:
   a first lens having negative refractive power, wherein an object-side surface of the first lens is a convex surface, and an image-side surface of the first lens is a concave surface; the object-side surface of the first lens and/or the image-side surface of the first lens are/is an aspheric surface;
   a second lens, which is a biconcave lens with negative refractive power;
   a third lens, which is a biconvex lens with positive refractive power, wherein an object-side surface of the third lens and an image-side surface of the second lens are adhered to form a compound lens with positive refractive power;
   a fourth lens having positive refractive power, wherein an object-side surface of the fourth lens is a convex surface;

an aperture;

a fifth lens having negative refractive power, wherein an object-side surface of the fifth lens is a convex surface;

a sixth lens having positive refractive power; and a seventh lens, which is a biconvex lens with positive refractive power, wherein an object-side surface of the seventh lens and/or an image-side surface of the seventh lens are/is an aspheric surface, wherein the optical imaging lens satisfies: 0.35>f3/F>0.25, wherein F is a focal length of the optical imaging lens; f3 is a focal length of the third lens.

7. The optical imaging lens as claimed in claim 1, wherein the optical imaging lens satisfies: 0.35>f4/F>0.3, wherein F is a focal length of the optical imaging lens; f4 is a focal length of the fourth lens.

8. The optical imaging lens as claimed in claim 1, wherein the optical imaging lens satisfies: 0.15>f56/F>0.05, wherein F is a focal length of the optical imaging lens; f56 is a focal length of a compound lens formed by adhering the fifth lens and the sixth lens.

9. The optical imaging lens as claimed in claim 1, wherein the optical imaging lens satisfies: −0.05>f5/F>−0.15, wherein F is a focal length of the optical imaging lens; f5 is a focal length of the fifth lens.

10. An optical imaging lens, in order from an object side to an image side along an optical axis, comprising:
    a first lens having negative refractive power, wherein an object-side surface of the first lens is a convex surface, and an image-side surface of the first lens is a concave surface; the object-side surface of the first lens and/or the image-side surface of the first lens are/is an aspheric surface;
    a second lens, which is a biconcave lens with negative refractive power;
    a third lens, which is a biconvex lens with positive refractive power, wherein an object-side surface of the third lens and an image-side surface of the second lens are adhered to form a compound lens with positive refractive power;
    a fourth lens having positive refractive power, wherein an object-side surface of the fourth lens is a convex surface;
    an aperture;
    a fifth lens having negative refractive power, wherein an object-side surface of the fifth lens is a convex surface;
    a sixth lens having positive refractive power; and
    a seventh lens, which is a biconvex lens with positive refractive power, wherein an object-side surface of the seventh lens and/or an image-side surface of the seventh lens are/is an aspheric surface, wherein the optical imaging lens satisfies: 0.3>f6/F>0.2, wherein F is a focal length of the optical imaging lens; f6 is a focal length of the sixth lens.

11. The optical imaging lens as claimed in claim 1, wherein the optical imaging lens satisfies: 0.37>f7/F>0.3, wherein F is a focal length of the optical imaging lens; f7 is a focal length of the seventh lens.

\* \* \* \* \*